US011268316B2

(12) United States Patent
Ben Trad et al.

(10) Patent No.: US 11,268,316 B2
(45) Date of Patent: Mar. 8, 2022

(54) ASYMMETRICAL SAFE VACUUM-INSULATED GLAZING UNIT

(71) Applicants: AGC GLASS EUROPE, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

(72) Inventors: Abderrazek Ben Trad, Woluwe Saint-Lambert (BE); Pierre Schneider, Saint Christophe sur le Nais (FR); Louis Dellieu, Waret-la-Chaussee (BE); Amelia Desmedt, Moustier (BE)

(73) Assignees: AGC GLASS EUROPE, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 0 days.

(21) Appl. No.: 17/044,162

(22) PCT Filed: May 13, 2019

(86) PCT No.: PCT/EP2019/062184
§ 371 (c)(1),
(2) Date: Sep. 30, 2020

(87) PCT Pub. No.: WO2019/219593
PCT Pub. Date: Nov. 21, 2019

(65) Prior Publication Data
US 2021/0054682 A1   Feb. 25, 2021

(30) Foreign Application Priority Data
May 14, 2018   (EP) .................................... 18172109

(51) Int. Cl.
*E06B 3/66* (2006.01)
*B32B 17/10* (2006.01)
(Continued)

(52) U.S. Cl.
CPC ...... *E06B 3/6612* (2013.01); *B32B 17/10055* (2013.01); *B32B 17/10761* (2013.01);
(Continued)

(58) Field of Classification Search
CPC .. E06B 3/6612; E06B 3/66304; E06B 3/6715; B32B 17/10761; B32B 17/10788;
(Continued)

(56) References Cited

U.S. PATENT DOCUMENTS

| 4,614,676 | A | * | 9/1986 | Rehfeld | ............ | B32B 17/10036 |
| | | | | | | 428/34 |
| 5,154,953 | A | * | 10/1992 | de Moncuit | ...... | B32B 17/10678 |
| | | | | | | 428/34 |
| 2013/0302542 | A1 | * | 11/2013 | Jones | .................... | E06B 3/6612 |
| | | | | | | 428/34 |

FOREIGN PATENT DOCUMENTS

| WO | WO 97/24294 A1 | 7/1997 |
| WO | WO 2005/000762 A1 | 1/2005 |
| WO | WO 2013/169504 A1 | 11/2013 |

OTHER PUBLICATIONS

International Search Report dated May 31, 2019 in PCT/EP2019/062184 filed on May 13, 2019.

* cited by examiner

*Primary Examiner* — Donald J Loney
(74) *Attorney, Agent, or Firm* — Oblon, McClelland, Maier & Neustadt, L.L.P.

(57) ABSTRACT

A vacuum insulating glazing unit is described. The vacuum insulating glazing unit has a first glass pane and a second glass pane; a set of discrete spacers positioned between the
(Continued)

first and second glass panes, maintaining a distance between the first and the second glass panes; a hermetically bonding seal sealing the distance between the first and second glass panes over a perimeter thereof; an internal volume defined by the first and second glass panes and the set of discrete spacers and closed by the hermetically bonding seal, where the internal volume has an absolute vacuum pressure of less than 0.1 mbar. The outer pane face of the second glass pane is laminated to at least one glass sheet by at least one polymer interlayer forming a laminated assembly.

21 Claims, 1 Drawing Sheet

(51) Int. Cl.
    *E06B 3/663*     (2006.01)
    *E06B 3/67*     (2006.01)

(52) U.S. Cl.
    CPC .... *B32B 17/10788* (2013.01); *E06B 3/66304* (2013.01); *E06B 3/6715* (2013.01)

(58) Field of Classification Search
    CPC .. B32B 17/10055; Y02B 80/22; Y02A 30/249
    See application file for complete search history.

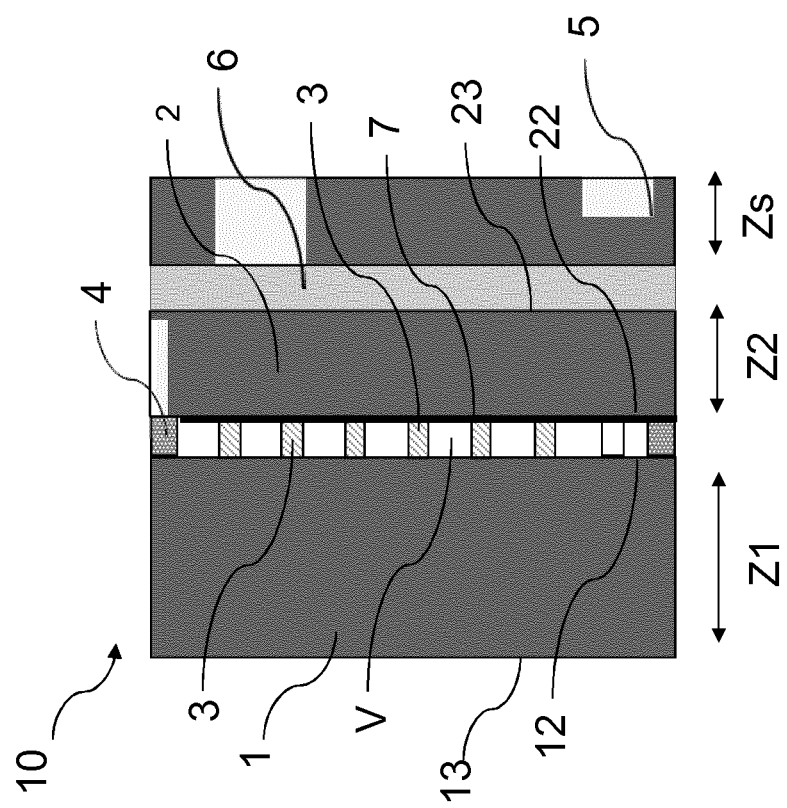

ASYMMETRICAL SAFE VACUUM-INSULATED GLAZING UNIT

1. FIELD OF THE INVENTION

The invention relates to a vacuum-insulated glazing unit wherein the glass panes are of different thicknesses and wherein the glass pane of smaller thickness, is further laminated.

2. BACKGROUND OF THE INVENTION

Vacuum-insulated glazing units are recommended because of their high-performance thermal insulation. A vacuum-insulated glazing unit is typically composed of at least two glass panes separated by an internal space in which a vacuum has been generated. In general, in order to achieve a high-performance thermal insulation (Thermal transmittance, U, being U<1.2 W/m²K) the absolute pressure inside the glazing unit is typically 0.1 mbar or less and generally at least one of the two glass pane is covered with a low-emissivity layer. To obtain such a pressure inside the glazing unit, a hermetically bonding seal is placed on the periphery of the two glass panes and the vacuum is generated inside the glazing unit by virtue of a pump. To prevent the glazing unit from caving in under atmospheric pressure (due to the pressure difference between the interior and exterior of the glazing unit), discrete spacers are placed between the two glass panes.

Recent vacuum-insulated glazing unit have been configured asymmetrically such that one glass pane is thicker than the other glass pane for improved mechanical performances. JP2001316137 indeed teaches to configure an asymmetric vacuum-insulated glazing unit wherein the inner glass pane disposed on the indoor side is thicker than the outer glass pane, to avoid deformation or distortion occurs even if the glass panes are hit by strong sunlight. JP2001316138 teaches the opposite VIG construction wherein the outer glass pane disposed on the outdoor side is thicker than the inner glass plane, for improved shock resistance and acoustic.

In addition to the mechanical performances, it is necessary that the vacuum-insulated glazing unit meets the safety requirement as registered in European Standard Norm EN12600 (ICS 81.040.20; 91.100.99—dated November 2002).

EP 1 544 180 discloses a vacuum-insulated glazing unit wherein one of the glass plate has an outer surface bonded to a plate-shaped member via an adhesive layer to minimize distortions of reflected images while maintaining a low coefficient of heat transmission.

In addition, natural illumination of interior spaces, especially buildings, is a critical parameter for creating pleasant and healthy environment for people. The daylight is the most interesting source of such illumination and it is important to have some transparent parts in building envelopes, to bring this light to the interior of the building. Therefore, there is a trend in the market to increase the size of the windows and transparent doors while requesting high-mechanical performances. Consequently, there is a demand to increase the size of vacuum-insulated glazing units. To sustain such large dimensions, it is necessary to limit the overall thickness of the vacuum-insulated glazing unit. Furthermore, when renovating old buildings, it is often required to fit new glazing within existing openings, which offer typically less space. It is necessary in those circumstances as well to limit the overall thickness of the vacuum-insulated glazing unit.

None of the art addresses the technical problem of configuring a vacuum-insulated glazing units with high mechanical performances, which passes the safety requirement test and can be designed with minimal overall thickness.

3. SUMMARY OF THE INVENTION

The present invention relates to a vacuum insulating glazing unit extending along a plane, P, defined by a longitudinal axis, X, and a vertical axis, Z, and comprising:

a) a first glass pane having a thickness $Z1$, and a second glass pane having a thickness, $Z2$, wherein the thicknesses are measured in the direction normal to the plane, P, and wherein $Z1$ is greater than $Z2$ ($Z1>Z2$). The thickness ratio, $Z1/Z2$, of the thickness of the first glass pane, $Z1$, to the thickness of the second glass pane, $Z2$, is equal to or greater than 1.10 ($Z1/Z2 \geq 1.10$). The thickness of the first glass pane, $Z1$, is equal to or greater to than 6 mm, ($Z1 \geq 6$ mm).

b) a set of discrete spacers (3) positioned between the first and second glass panes, maintaining a distance between the first and the second glass panes.

c) a hermetically bonding seal (4) sealing the distance between the first and second glass panes over a perimeter thereof.

d) an internal volume, V, defined by the first and second glass panes and the set of discrete spacers and closed by the hermetically bonding seal and wherein there is an absolute vacuum of pressure of less than 0.1 mbar.

The second glass pane has an inner pane face (22) and an outer pane face (23). The outer pane face (23) of the second glass pane (2) is laminated to at least one glass sheet (5) by at least one polymer interlayer (6) forming a laminated assembly wherein the at least one glass sheet has a thickness, $Zs$, equal to or greater than 0.5 mm ($Zs \geq 0.5$ mm) wherein the thickness is measured in the direction normal to the plane, P.

The present invention further relates to a partition separating an exterior space from an interior space Said partition comprises an opening being closed by a vacuum insulating glazing unit according to the present invention, preferably wherein the first glass pane is facing the exterior space. The present invention further relates to the use of a vacuum insulated glazing unit according to the present invention to close the opening of such partition.

Other aspects and advantages of the embodiments will become apparent from the following detailed description taken in conjunction with the accompanying drawings which illustrate, by way of example, the principles of the described embodiments.

4. BRIEF DESCRIPTION OF THE DRAWINGS

FIG. 1 shows a cross sectional view of an asymmetric vacuum-insulated glazing unit according to one embodiment of the present invention.

5. DETAILED DESCRIPTION OF THE INVENTION

It is an object of the present invention to provide a vacuum-insulated glazing unit (hereinafter referred as VIG) which demonstrates high mechanical performances, fulfills the safety requirements and that can be configured with minimal overall thickness, while allowing large dimensions.

The invention relates to a vacuum-insulated glazing unit typically comprising a first glass pane and a second glass pane that are associated together by way of set of discrete spacers that holds said panes a certain distance apart, typically in the range of between 50 μm and 1000 μm, preferably between 500 μm and 500 μm and more preferably between 50 μm and 150 μm, and between said glass panes, an internal space comprising at least one first cavity, in which cavity there is a vacuum of absolute pressure of less than 0.1 mbar, said space being closed with a peripheral hermetically bonding seal placed on the periphery of the glass panes around said internal space.

As illustrated in FIG. 1, the vacuum insulating glazing unit (10) extending along a plane, P, defined by a longitudinal axis, X, and a vertical axis, Z. The asymmetric VIG of the present invention comprises:

a) a first glass pane (1) having a thickness $Z1$, and a second glass pane (2) having a thickness, $Z2$, wherein the thicknesses are measured in the direction normal to the plane, P. The second glass pane has an inner pane face (22) and an outer pane face (23). The outer pane face of the second pane is further laminated to at least one glass sheet (5) by at least one polymer interlayer (6) forming a laminated assembly;

b) a set of discrete spacers (3) positioned between the first and second glass panes and maintaining a distance between the first and the second glass panes;

c) a hermetically bonding seal (4) sealing the distance between the first and second glass panes over a perimeter thereof;

d) an internal volume, V, defined by the first and second glass panes and the set of discrete spacers and closed by the hermetically bonding seal and wherein there is a vacuum of absolute pressure of less than 0.1 mbar.

Within the VIG, the first glass pane has an inner pane face (12) and an outer pane face (13). The second glass pane has an inner pane face (22) and an outer pane face (23). The inner pane faces are facing the internal volume, V, of the asymmetric VIG. The outer pane faces are facing the exterior of the VIG. In parallel, the at least one glass sheet has an inner sheet surface and an outer sheet surface wherein the inner sheet surface faces the glass pane to which it is laminated and the outer sheet surface faces the exterior of the VIG.

Within the present invention, $Z1$ is greater than $Z2$ ($Z1>Z2$) so that the thickness ratio, $Z1/Z2$, of the thickness of the first glass pane, $Z1$, to the thickness of the second glass pane, $Z2$, is equal to or greater than 1.10 ($Z1/Z2 \geq 1.10$). In a preferred embodiment, the thickness ratio, $Z1/Z2$, is equal to or greater than 1.30 ($Z1/Z2 \geq 1.30$), preferably is equal to or greater than 1.55 ($Z1/Z2 \geq 1.55$), more preferably is comprised between 1.60 and 6.00 ($1.60 \leq Z1/Z2 \leq 6.00$), ideally is comprised between 2.00 and 4.00 ($2.00 \leq Z1/Z2 \leq 4.00$). It has been surprisingly found that the higher the $Z1/Z2$ ratio, the better it is for achieving higher mechanical performances. Deformation or distortion may be limited even if the glass panes surfaces are faced severe temperature difference between interior and exterior environments.

Within the present invention, the thickness of the first glass pane, $Z1$, of the asymmetric VIG, is equal to or greater than 6 mm ($Z1 \geq 6$ mm), preferably is equal to or greater to 7 mm, ($Z1 \geq 7$ mm), more preferably equal to or greater to 8 mm, ($Z1 \geq 8$ mm). Typically, the thickness of the first glass pane, $Z1$, will be not more than 12 mm, preferably not more than 10 mm.

In a preferred embodiment, the thickness of the second glass pane, $Z2$, of the asymmetric VIG, is equal to or greater than 1 mm ($Z2 \geq 1$ mm), preferably is equal to or greater to 2 mm, ($Z2 \geq 2$ mm), preferably equal to or greater to 3 mm, ($Z2 \geq 3$ mm). Typically, the thickness of the second glass pane, $Z2$, will be not more than 10 mm, preferably not more than 8 mm. However, in order to improve the mechanical resistance and to minimize the overall thickness of the asymmetric VIG of the present invention, it is preferred to keep the thickness of the second pane, $Z2$, to a minimum.

Within the present invention, the outer pane face of the second glass pane (23) is further laminated to at least one glass sheet (5) by at least one polymer interlayer (6) forming a laminated assembly. Said glass sheet has a thickness, $Zs$, equal to or greater than 0.5 mm ($Zs \geq 0.5$ mm). The thickness is measured in the direction normal to the plane, P.

The present invention is based on the surprising finding that the asymmetric VIG of the present invention provides high mechanical performances, meets the safety requirement while minimize the overall thickness of the VIG. The overall thickness of the VIG is obtained by adding the thicknesses of the first glass pane, the second glass pane, all additional glass sheet(s) and all polymer interlayer(s). Table 1 below illustrates a safe asymmetric VIG of smaller overall thickness than its corresponding safe symmetric VIG.

TABLE 1

| | Symmetric VIG (Comparative example) | Asymmetric VIG (Within the present invention) |
|---|---|---|
| First glass pane | soda-lime silica glass $Z1 = 6$ mm | soda-lime silica glass $Z1 = 6$ mm |
| Second glass plane | soda-lime silica glass $Z2 = 6$ mm | soda-lime silica glass $Z1 = 3$ mm |
| Thermoplastic Interlayer | 0.76 mm of polyvinyl butyral | 0.76 mm of polyvinyl butyral |
| Additional glass sheet | soda-lime silica glass $Zs = 2$ mm | soda-lime silica glass $Zs = 2$ mm |
| Overall thickness | 14.76 mm | 11.76 mm |

As it can been seen from the table above, the overall thickness of the asymmetric VIG of the present invention is 11.76 mm whereas the overall thickness of the corresponding symmetric VIG reaches up to 14.76 mm. Minimizing the overall thickness of the VIG is highly useful in renovation and to dimension large VIG sizes.

Glass Panes and Sheets

The first glass pane, the second glass pane and the at least one of the glass sheet of the present invention can be chosen among float clear, extra-clear or colored glass. The term "glass" is herein understood to mean any type of glass or equivalent transparent material, such as a mineral glass or an organic glass. The mineral glasses used may be irrespectively one or more known types of glass such as soda-lime-silica, aluminosilicate or borosilicate, crystalline and polycrystalline glasses. The glass panes and/or sheet(s) can be obtained by a floating process, a drawing process, a rolling process or any other process known to manufacture a glass pane starting from a molten glass composition. The glass panes and/or sheet(s) can optionally be edge-ground. Edge grinding renders sharp edges into smooth edges which are much safer for people who could come in contact with the vacuum-insulating glazing unit, in particular with the edge of the glazing. Preferably, the glass panes and/or sheet(s) according to the invention are of soda-lime-silica glass, aluminosilicate glass or borosilicate glass. Preferably, the glass panes are panes made of soda-lime-silica glass and the at least one glass sheet is made from of aluminosilicate glass. More preferably and for reasons of lower production costs, the glass panes are panes of soda-lime-silica glass and the glass sheet(s) according to the invention is of soda-lime-silica glass.

In a preferred embodiment, to maintain the high mechanical performances and/or to improve further the safety of the VIG, the first glass pane and/or one or more of the at least one glass sheet can be a pre-stressed glass. By pre-stressed glass, it means a heat strengthened glass, a thermally toughened safety glass, or a chemically strengthened glass. When one glass sheet is a pre-stressed glass sheet, it is preferred that such glass sheet has a thickness equal to or lower than 2 mm, (Zs≤2 mm) and preferably is laminated to the outer pane face (22) of the second glass pane of the asymmetric VIG.

Heat strengthened glass is heat treated using a method of controlled heating and cooling which places the outer glass surfaces under compression and the inner glass surface under tension. This heat treatment method delivers a glass with a bending strength greater than annealed glass but less than thermally toughened safety glass.

Thermally toughened safety glass is heat treated using a method of controlled heating and cooling which puts the outer glass surface under compression and the inner glass surface under tension. Such stresses cause the glass, when impacted, to break into small granular particles instead of splintering into jagged shards. The granular particles are less likely to injure occupants or damage objects.

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. Aluminosilicate-type glass compositions, such as for example those from the products range DragonTrail® from Asahi Glass Co. or those from the products range Gorilla® from Corning Inc., are also known to be very efficient for chemical tempering.

Preferably, the composition for the first and second glass panes and/or the at least one glass sheet of the asymmetric VIG of the present invention comprises the following components in weight percentage, expressed with respect to the total weight of glass (Comp. A). More preferably, the glass composition (Comp. B) is a soda-lime-silicate-type glass with a base glass matrix of the composition comprising the following components in weight percentage, expressed with respect to the total weight of glass.

|  | Comp. A | Comp. B |
| --- | --- | --- |
| $SiO_2$ | 40-78% | 60-78 wt % |
| $Al_2O_3$ | 0-18% | 0-8 wt %, pref 0-6 wt % |
| $B_2O_3$ | 0-18% | 0-4 wt %, pref 0-1 wt % |
| $Na_2O$ | 0-20% | 5-20 wt %, pref 10-20 wt % |
| CaO | 0-15% | 0-15 wt %, pref 5-15 wt % |
| MgO | 0-10% | 0-10 wt %, pref 0-8 wt % |
| $K_2O$ | 0-10% | 0-10 wt % |
| BaO | 0-5% | 0-5 wt %, pref 0-1 wt %. |

Other preferred glass compositions for the first and second glass panes and/or the at least one glass sheet of the asymmetric VIG unit of the present invention, comprises the following components in weight percentage, expressed with respect to the total weight of glass:

| Comp. C | Comp. D | Comp. E |
| --- | --- | --- |
| $65 \leq SiO_2 \leq 78$ wt % | $60 \leq SiO_2 \leq 78\%$ | $65 \leq SiO_2 \leq 78$ wt % |
| $5 \leq Na_2O \leq 20$ wt % | $5 \leq Na_2O \leq 20\%$ | $5 \leq Na_2O \leq 20$ wt % |
| $0 \leq K_2O < 5$ wt % | $0.9 < K_2O \leq 12\%$ | $1 \leq K_2O < 8$ wt % |
| $1 \leq Al_2O_3 < 6$ wt %, pref $3 < Al_2O_3 \leq 5\%$ | $4.9 \leq Al_2O_3 \leq 8\%$ | $1 \leq Al_2O_3 < 6$ wt % |
| $0 \leq CaO < 4.5$ wt % | $0.4 < CaO < 2\%$ | $2 \leq CaO < 10$ wt % |
| $4 \leq MgO \leq 12$ wt % | $4 < MgO \leq 12\%$ | $0 \leq MgO \leq 8$ wt % |
| $(MgO/(MgO + CaO)) > 0.5$, pref $0.88 \leq [MgO/(MgO + CaO)] < 1$. |  | $K_2O/(K_2O + Na_2O)$: 0.1-0.7. |

In particular, examples of base glass matrixes for the composition according to the invention are described published in PCT patent applications WO2015/150207A1, WO2015/150403A1 WO2016/091672 A1, WO2016/169823A1 and WO2018/001965 A1.

The glass panes can be of the same dimensions or of different dimensions and form thereby a stepped VIG. In a preferred embodiment of the present invention, the first and the second glass panes comprise first and second peripheral edges, respectively and wherein the first peripheral edges are recessed from the second peripheral edges or wherein the second peripheral edges are recessed from the first peripheral edges. The peripheral edges of the at least one glass sheets (5) are aligned with the peripheral edges of the glass pane to which it is laminated. This configuration allows to reinforce the strength of the hermetically bonding seal.

Laminate Assembly

The laminate assembly within the asymmetric VIG of the present invention can comprise from 1 to 4 additional glass sheet(s) and corresponding additional layers of polymer interlayer. However, in order to minimize the overall thickness of the asymmetric VIG of the present invention, it is preferred to laminate to the outer pane face of the second glass pane from 1 to 2 glass sheet(s), preferably only 1 glass sheet.

Said glass sheet has a thickness, Zs, equal to or greater than 0.5 mm (Zs≥0.5 mm), preferably equal to or greater than 1 mm (Zs≥1 mm), more preferably equal to or greater than 2 mm (Zs≥2 mm), even more preferably equal to or greater than 3 mm (Zs≥3 mm). Typically, the thickness of the glass sheet, Zs, will be not more than 8 mm, preferably no more than 6 mm. The thicknesses are measured in the direction normal to the plane, P.

The polymer interlayer to be used in the present invention typically comprises a material selected from the group consisting ethylene vinyl acetate (EVA), polyisobutylene (PIB), polyvinyl butyral (PVB), polyurethane (PU), polyvinyl chlorides (PVC), polyesters, copolyesters, polyacetals, cyclo olefin polymers (COP), ionomer and/or an ultraviolet activated adhesive, and others known in the art of manufacturing glass laminates. Blended materials using any compatible combination of these materials can be suitable as well. In a preferred embodiment, the at least polymer interlayer comprises a material selected from the group consisting of ethylene vinyl acetate, and/or polyvinyl butyral, more preferably polyvinyl butyral. The polymer interlayer is also designated as a "bonding interlayer" since the polymer interlayer and the glass pane form a bond that results in adhesion between the glass pane and the polymer interlayer In a preferred embodiment, the polymer interlayer to be used in the present invention is a transparent or translucent polymer interlayer. However, for decorative applications, the polymer interlayer may be colored or patterned.

Typical thicknesses (measured in the direction normal to the plane, P) for the at least one polymer interlayer are 0.3 mm to 3.5 mm, preferably 0.75 mm to 1.75 mm. Commercially available polymer interlayers are polyvinyl butyral (PVB) layers of 0.38 mm and 0.76 mm, 1.52 mm, 2.28 m and 3.04 mm. To achieve the desired thickness, one or more of those films can be used.

To form the laminate assembly within the VIG of the present invention, polyvinyl butyral polymer interlayers are preferably used. Polyvinyl butyral (or PVB) is a resin known for applications that require strong binding, optical clarity, adhesion to many surfaces, toughness and flexibility. It is prepared from polyvinyl alcohol by reaction with butyraldehyde. Trade names for PVB-films include KB PVB, Saflex, GlasNovations, WINLITE, S-Lec, Trosifol and EVERLAM. The bonding process takes place under heat and pressure also designated as autoclave process which is well known in the art. When laminated under these conditions, the PVB interlayer becomes optically clear and binds the two panes of glass together. Once sealed together, the laminate behaves as a single unit and looks like normal glass. The polymer interlayer of PVB is tough and ductile, so brittle cracks will not pass from one side of the laminate to the other.

Another process known in the art and preferred for the present invention, is the autoclave free laminated glass production. As named, such a process does not involve the use of an autoclave for lamination. Only a so called vacuum bag process is required.

This process reduces energy costs but has the drawback of limiting the types and thickness of polymer interlayer. Autoclave free oven makes preferentially EVA and dedicated PVB laminated glass. In such case, to achieve the desired thickness and security requirements, one or more of those autoclave free polymer interlayers can be used.

The polymer interlayer used in the laminate assembly of the present invention provides the following contribution to the safety of the asymmetric VIG of the present invention: firstly, the polymer interlayer distributes impact forces across a greater area of the glass panes, thus increasing the impact resistance of the glass. Secondly, the polymer interlayer binds the resulting shards if the glass is ultimately broken. Thirdly, the polymer interlayer undergoes plastic deformation during impact and under static loads after impact, absorbing energy and reducing penetration by the impacting object as well as reducing the energy of the impact that is transmitted to impacting object.

In a further preferred embodiment, the first glass pane can also be further laminated to at least one glass sheet by at least one polymer interlayer forming a laminated assembly. In this embodiment, the at least one glass sheet has typically a thickness, Zs2 of at most the thickness of the first glass pane, Z1 (Zs2≤Z1). All embodiments and preferred technical features of the glass sheet and polymer interlayer described above in relation to the second glass pane apply correspondingly to laminated assembly of the first glass pane.

In an alternative preferred embodiment, the outer pane face (11) the first glass pane is provided with at least one spall shield polymer film, preferably with a polyester spall shield polymer film. In this embodiment, it is further preferred the first glass pane to be made from borosilicate glass, soda-lime-silica glass or aluminosilicate glass, more preferably soda-lime-silica glass. Preferably such asymmetric VIG is used to close the opening of a partition whereby the first pane is facing the exterior space.

Suitable spall shield polymer film for use in the present invention has a high modulus, excellent tear strength and excellent adhesion directly to glass. As such, a suitable polymer interlayer material or material blend should have a Storage Young's Modulus of at least 50 MPa at temperatures up to 40° C. It can be useful to vary the thickness of the spall shield polymer film in order to enhance the tear strength, for example. Typical thicknesses (measured in the direction normal to the plane, P) for spall shield polymer film is at least 1.0 mm, preferably at least 1.25 mm. The spall shield polymer film is generally self-adhered directly to the outer pane face of the first glass pane. By Self-adhered, it is meant that the polymer film/glass face does not require and therefore possibly may not include any intervening layers of adhesives and/or glass surface pre-treatment to obtain bonding suitable for use as a safety glass. Suitable polyester spall shield polymer film useful in the practice of the present invention can be purchased commercially from, for example, E.I. DuPont de Nemours & Company under the trade name of SentryGlass®. It has been found that the first glass pane when provided with such spall shield polymer film, demonstrates excellent durability, impact resistance, toughness, and resistance to cuts inflicted by glass once the glass is shattered. Therefore such VIG configuration is particularly useful in architectural applications in buildings subjected to hurricanes and windstorms.

Partition

The asymmetric VIG of the present invention is typically used to close an opening within a partition such as in general-purpose glazing units, a build wall automotive glazing units or architectural glazing units, appliances . . . . This partition separates an exterior space from an interior space, typically a partition separating the exterior space from the interior space of a building. In a preferred embodiment, the asymmetric VIG of the present invention will close an opening of a partition separating an exterior space from an interior space, whereby the first glass pane of the asymmetric of the VIG is facing the exterior space. Indeed, it had been found that to maximize the technical advantages of the asymmetric VG of the present invention the first glass pane having a thickness equal or greater to 6 mm may be acceptable for passing the safety requirement test and contributes to limit the overall thickness of the asymmetric VIG unit.

The present invention also relates to the use of an asymmetric vacuum insulated glazing unit as defined above, to close the opening of a partition separating an exterior space from an interior space, and wherein the first glass pane is facing the exterior space.

In some embodiment of the present invention, films such as low emissivity films, solar control films (a heat ray reflection films), anti-reflective films, anti-fog films, preferably a heat ray reflection film or a low emissivity film, can be provided on at least one of the inner pane faces (12, 22) and/or outer pane faces (13, 23) of the first and/or second float glass panes (1, 2) of the vacuum-insulated glazing unit (10). In a preferred embodiment of the present invention such as shown in FIG. 1, the inner pane faces (22) of the second float glass panes (2) of the asymmetric VIG is provided with a heat ray reflection film or a low-E film (7). Preferably when the asymmetric VIG is used to close the opening of a partition whereby the first pane is facing the exterior space, then, the inner pane faces (22) of the second glass pane (2) of the vacuum-insulated glazing unit (10), is provided with a heat ray reflection film or a low-E film.

Reinforced acoustic insulation with acoustic laminated glass may also be used within the present invention. In such case, the polymer interlayer comprises at least one additional acoustic material inserted between two polyvinyl butyral films.

Glass panes with electrochromic, thermochromic, photochromic or photovoltaic elements are also compatible with the present invention.

Multiple Insulating Glazing

In another embodiment of the present invention, the present invention also applies to any type of glazing unit comprising glass panes (two, three or more) bounding insulating or non-insulating internal spaces (also called multiple glazing units) provided that a partial vacuum is generated in at least one of these internal spaces. Therefore, in one embodiment, to improve the mechanical performances of the asymmetric VIG of the present invention, a third additional glass pane can be coupled to at least one of the outer pane faces (13 and/or 23) of the first and second glass pane along the periphery of the VIG via a peripheral spacer bar, also known as a spacer window profile, creating in insulating cavity sealed by a peripheral edge seal. Said peripheral spacer bar maintained a certain distance between the third glass pane and the at least one of the outer pane face one of the first and second glass panes. Typically said spacer bar comprises a dessicant and has typically a thickness comprised between 6 mm to 20 mm, preferably 9 to 15 mm. In general, said second internal volume is filled with a predetermined gas selected from the group consisting of air, dry air, argon (Ar), krypton (Kr), xenon (Xe), sulfur hexafluoride (SF6), carbon dioxide or a combination thereof. Said predetermined gas are effective for preventing heat transfer and/or may be used to reduce sound transmission.

Spacers

As depicted in FIG. 1, the vacuum-insulated glazing unit of the present invention comprises a plurality of discrete spacers (3), also referred to as pillars, sandwiched between the first and second glass panes (1, 2) so as to maintain the internal volume, V. As per invention, the discrete spacers are positioned between the first and second glass panes, maintaining a distance between the first and the second glass panes and forming an array having a pitch, X, comprised between 10 mm and 100 mm ($10 \text{ mm} \leq \lambda \leq 100 \text{ mm}$). By pitch, it is meant the interval between the discrete spacers. In a preferred embodiment, the pitch is comprised between 20 mm and 80 mm ($20 \text{ mm} \leq \lambda \leq 80 \text{ mm}$), more preferably between 20 mm and 50 mm ($20 \text{ mm} \leq \lambda \leq 50 \text{ mm}$). The array within the present invention is typically a regular array based on an equilateral triangular, square or hexagonal scheme, preferably based on a square scheme.

The discrete spacers can have different shapes, such as cylindrical, spherical, filiform, hourglass, C-shaped, cruciform, prismatic shape . . . . It is preferred to use small pillars, i.e. pillars having in general a contact surface to the glass pane, defined by its external circumference, equal to or lower than 5 mm$^2$, preferably equal to or lower than 3 mm$^2$, more preferably equal to or lower than 1 mm$^2$. These values may offer a good mechanical resistance whilst being aesthetically discrete. The discrete spacers are typically made of a material having a strength endurable against pressure applied from the surfaces of the glass panes, capable of withstanding high-temperature process such as burning and baking, and hardly emitting gas after the glass pane is manufactured. Such a material is preferably a hard metal material, quartz glass or a ceramic material, in particular, a metal material such as iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride or the like.

Hermetically Bonding Seal

As shown in FIG. 1, the internal volume, V, delimited between the glass panes (1, 2) of the vacuum-insulated glazing unit (10) of the present invention is closed with a hermetically bonding seal (4) placed on the periphery of the glass panes around said internal space. The said hermetically bonding seal is impermeable and hard. Such as used here and unless otherwise indicated, the term "impermeable" is understood to mean impermeable to air or any other gas present in the atmosphere.

Various hermetically bonding seal technologies exist. A first type of seal (the most widespread) is a seal based on a solder glass for which the melting point is lower than that of the glass of the glass panes of the glazing unit. The use of this type of seal limits the choice of low-E layers to those that are not degraded by the thermal cycle required to implement the solder glass, i.e. to those that are able to withstand a temperature possibly as high as 250° C. In addition, since this type of solder-glass-based seal is only very slightly deformable, it does not allow the effects of differential expansion between the interior-side glass pane of the glazing unit and the exterior-side glass pane of the glazing unit when said panes are subjected to large temperature differences to be absorbed. Quite substantial stresses are therefore generated at the periphery of the glazing unit and may lead to breakage of the glass panes of the glazing unit.

A second type of seal comprises a metal seal, for example a metal strip of a small thickness (<500 μm) soldered to the periphery of the glazing unit by way of a tie underlayer covered at least partially with a layer of a solderable material such as a soft tin-alloy solder. One substantial advantage of this second type of seal relative to the first type of seal is that it is able to partially deform in order to partially absorb the differential expansion created between the two glass panes. There are various types of tie underlayers on the glass pane.

Patent application WO 2011/061208 A1 describes one example embodiment of a peripheral impermeable seal of the second type for a vacuum-insulated glazing unit. In this embodiment, the seal is a metal strip, for example made of copper that is soldered by means of a solderable material to an adhesion band provided on the periphery of the glass panes.

Internal Volume

A vacuum of absolute pressure less than 0.1 mbar, preferably less than 0.01 mbar is created, within the internal volume, V, defined by the first and second glass panes and the set of discrete spacers and closed by the hermetically bonding seal within the asymmetric VIG of the present invention.

The internal volume of the asymmetric VIG of the present invention, can comprise a gas, for example, but not exclusively, air, dry air, argon (Ar), krypton (Kr), xenon (Xe), sulfur hexafluoride (SF 6), carbon dioxide or a combination thereof. The transfer of energy through an insulating pane having this conventional structure is decreased, because of the presence of the gas in the internal volume, relative to a single glass pane.

The internal volume may also be pumped of any gas, creating therefore a vacuum glazing unit. Energy transfer through a vacuum-insulated insulating glazing unit is greatly decreased by the vacuum. To generate the vacuum in the internal space of the glazing unit, a hollow glass tube bringing the internal space into communication with the exterior is generally provided on the main face of one of the glass panes. Thus, the partial vacuum is generated in the internal space by pumping out gases present in the internal space by virtue of a pump connected to the exterior end of the glass tube.

To maintain for the duration a given vacuum level in a vacuum-insulated glazing unit a getter may be used in the glazing unit. Specifically, the internal surfaces of the glass panes making up the glazing unit may release over time gases absorbed beforehand in the glass, thereby increasing the internal pressure in the vacuum-insulated glazing pane and thus decreasing the vacuum performance. Generally, such a getter consists of alloys of zirconium, vanadium, iron, cobalt, aluminum, etc., and is deposited in the form of a thin layer (a few microns in thickness) or in the form of a block placed between the glass panes of the glazing pane so as not to be seen (for example hidden by an exterior enamel or by a portion of the peripheral impermeable seal). The getter forms, on its surface, a passivation layer at room temperature, and must therefore be heated in order to make the passivation layer disappear and thus activate its alloy gettering properties. The getter is said to be "heat activated".

EXAMPLES

Examples 1 and 2 illustrate different embodiments of asymmetric VIG of the present invention, demonstrating high mechanical performances, meeting the safety requirement while minimizing the overall thickness of the VIG configuration.

|  | Example 1 | Example 2 |
| --- | --- | --- |
| First glass pane | soda-lime silica glass<br>Z1 = 8 mm | soda-lime silica glass<br>Z1 = 6 mm |
| Second glass pane | soda-lime silica glass<br>Z2 = 4 mm | soda-lime silica glass<br>Z1 = 3 mm |
| polymer Interlayer | 0.76 mm of polyvinyl butyral | 0.76 mm of polyvinyl butyral |
| Additional glass sheet | soda-lime silica glass<br>Zs = 2 mm | soda-lime silica glass<br>Zs = 2 mm |
| Overall thickness | 14.76 mm | 11.76 mm |

Examples 3 and 4 illustrate different embodiments of asymmetric VIG of the present invention, demonstrating the maintenance of high mechanical performances, meeting better safety requirements while minimizing the overall thickness of the VIG configuration.

|  | Example 3 | Example 4 |
| --- | --- | --- |
| First glass pane | prestressed soda-lime silica glass<br>Z1 = 6 mm | soda-silicate glass<br>Z1 = 6 mm |
| Coating on outer pane face (12) | No | spallshield layer, SentryGlass from supplier = 1.25 mm |
| Second glass pane | soda-lime silica glass<br>Z2 = 3 mm | soda-lime silica glass<br>Z2 = 3 mm |
| polymer Interlayer | 0.76 mm of polyvinyl butyral | 0.76 mm of polyvinyl butyral |
| Additional glass sheet | soda-lime silica glass<br>Zs = 2 mm | soda-lime silica glass<br>Zs = 2 mm |
| Overall thickness | 11.76 mm | 13.01 mm |

| Ref. # | Feature |
| --- | --- |
| 10 | Vacuum-insulated glazing |
| 1 | First glass pane |
| 12 | Inner pane face of the first glass pane |
| 13 | Outer pane face of the first glass pane |
| 2 | Second glass pane |
| 22 | Inner pane face of the second glass pane |
| 23 | Outer pane face of the second glass pane |
| 3 | Discrete spacer |
| 4 | Hermetically bonding seal |
| 5 | Glass sheet |
| 6 | Polymer interlayer |
| 7 | Heat ray reflection film or Low emissivity film |
| V | Internal volume |

The invention claimed is:

1. A vacuum insulating glazing unit extending along a plane, P, defined by a longitudinal axis, X, and a vertical axis, Z, the vacuum insulating glazing unit comprising:
a first glass pane having a thickness Z1, and a second glass pane having a thickness, Z2, wherein the thicknesses are measured in a direction normal to the plane, P, wherein the first and second glass panes each have an inner pane face and an outer pane face;
a set of discrete spacers positioned between the first and second glass panes, maintaining a distance between the first and second glass panes;
a hermetically bonding seal sealing the distance between the first and second glass panes over a perimeter thereof; and
an internal volume, V, defined by the first and second glass panes and the set of discrete spacers and closed by the hermetically bonding seal, the internal volume, V, having an absolute vacuum pressure of less than 0.1 mbar, and wherein the inner pane faces of both the first and second glass panes face the internal volume, V;
wherein the thickness of the first glass pane, Z1, is equal to or greater to than 6 mm,
wherein a thickness ratio, Z1/Z2, of the thickness of the first glass pane, Z1, to the thickness of the second glass pane, Z2, is equal to or greater than 1.10, and
wherein the outer pane face of the second glass pane is laminated to at least one glass sheet by at least one polymer interlayer forming a laminated assembly wherein the at least one glass sheet has a thickness, Zs, equal to or greater than 0.5 mm, wherein the thickness is measured in a direction normal to the plane, P.

2. The vacuum insulating glazing unit according to claim 1, wherein the thickness of the at least one glass sheet, Zs, is equal to or greater than 1 mm.

3. The vacuum insulating glazing unit according to claim 1, wherein the thickness ratio, Z1/Z2, is equal to or greater than 1.30.

4. The vacuum insulating glazing unit according to claim 1, wherein the thickness of the second glass pane, Z2, is equal to or greater to 1 mm.

5. The vacuum insulating glazing unit according to claim 1, wherein the thickness of the first glass pane, Z1, is equal to or greater to 7 mm.

6. The vacuum insulating glazing unit according to claim 1, wherein the at least one polymer interlayer comprises a at least one material selected from the group consisting of an ethylene vinyl acetate, a polyisobutylene, a polyvinyl butyral, a polyurethane, a polyvinyl chloride, a polyester, a copolyester, a polyacetal, a cyclo olefin polymer, an ionomer, an ultraviolet activated adhesive, and combinations thereof.

7. The vacuum insulating glazing unit according to claim 1, wherein the thickness of the at least one polymer interlayer, measured in a direction normal to the plane, P, 0.3 mm to 3.5 mm.

8. The vacuum insulating glazing unit according to claim 1, wherein the set of discrete spacers forms a array having a pitch between 10 mm and 100 mm.

9. The vacuum insulating glazing unit according to claim 1, wherein at least one of the inner faces and/or outer faces of the first and/or second glass panes has at least a heat ray reflection film or a low-emissivity film.

10. The vacuum insulating glazing unit according to claim 1, wherein the first glass pane is a pre-stressed glass pane.

11. A vacuum insulating glazing unit according to claim 1, wherein the outer pane face of the first glass pane is laminated to at least one second glass sheet by at least one second polymer interlayer forming a second laminated assembly, and
wherein the at least one second glass sheet has a thickness, Zs2, equal to or less than the thickness of the first pane, Z1.

12. A vacuum insulating glazing unit according to claim 1, wherein the outer pane face of the first glass pane has at least one spall shield polymer film.

13. A partition defining an exterior space and an interior space, the partition comprising:
an opening closed by the vacuum insulating glazing unit according to claim 1, wherein the first glass pane faces the exterior space.

14. A method of closing a partition, the method comprising:
placing a vacuum insulated glazing unit according to claim 1 on an opening of a partition,
wherein the partition defines an exterior space and an interior space, and
wherein the first glass pane faces the exterior space.

15. The vacuum insulating glazing unit according to claim 1, wherein an overall thickness of the vacuum insulating glazing unit is less than or equal to 15 mm.

16. A vacuum insulating glazing unit extending along a plane, P, defined by a longitudinal axis, X, and a vertical axis, Z, wherein the vacuum insulating glazing unit has excellent mechanical performance such that deformation or distortion is limited even when faced with severe temperature differences, the vacuum insulating glazing unit comprising:
a first glass pane having a thickness Z1, and a second glass pane having a thickness, Z2, wherein the thicknesses are measured in a direction normal to the plane, P, wherein the first and second glass panes each have an inner pane face and an outer pane face;
a set of discrete spacers positioned between the first and second glass panes, maintaining a distance between the first and second glass panes, wherein the distance between the first and second glass panes is between 50 µm and 1000 µm;
a hermetically bonding seal sealing the distance between the first and second glass panes over a perimeter thereof, and
an internal volume, V, defined by the first and second glass panes and the set of discrete spacers and closed by the hermetically bonding seal, the internal volume, V, having an absolute vacuum of pressure of less than 0.1 mbar, and wherein the inner pane faces of both the first and second glass panes face the internal volume, V;
wherein the thickness of the first glass pane, Z1, is equal to or greater to than 6 mm,
wherein a thickness ratio, Z1/Z2, of the thickness of the first glass pane, Z1, to the thickness of the second glass pane, Z2, is equal to or greater than 1.10, and
wherein the outer pane face of the second glass pane is laminated to at least one glass sheet by at least one polymer interlayer forming a laminated assembly wherein the at least one glass sheet has a thickness, Zs, equal to or greater than 0.5 mm, wherein the thickness is measured in a direction normal to the plane, P.

17. The vacuum insulating glazing unit according to claim 1, wherein the at least one polymer interlayer comprises a material selected from the group consisting of ethylene vinyl acetate (EVA), polyisobutylene (PIB), and polyvinyl butyral (PVB).

18. The vacuum insulating glazing unit according to claim 16, wherein the at least one polymer interlayer comprises polyvinyl butyral (PVB).

19. The vacuum insulating glazing unit according to claim 1, wherein the set of discrete spacers are made of a material selected from the group consisting of quartz glass, iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin, corundum, alumina, mullite, magnesia, yttria, aluminum nitride, and silicon nitride.

20. The vacuum insulating glazing unit according to claim 16, wherein the set of discrete spacers are made of a material selected from the group consisting of quartz glass, iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin, corundum, alumina, mullite, magnesia, yttria, aluminum nitride, and silicon nitride.

21. The vacuum insulating glazing unit according to claim 1, wherein a distance between the first and second glass panes is between 50 µm and 1000 µm.

\* \* \* \* \*